United States Patent [19]

Moessinger

[11] Patent Number: 5,630,629
[45] Date of Patent: May 20, 1997

[54] FASTENING ELEMENT

[75] Inventor: Klaus Moessinger, Obersulm, Germany

[73] Assignee: Filterwerk Mann & Hummel GmbH, Ludwigsburg, Germany

[21] Appl. No.: 354,764

[22] Filed: Dec. 12, 1994

[30] Foreign Application Priority Data

Dec. 10, 1993 [DE] Germany ............................ 9318988 U

[51] Int. Cl.$^6$ ............................................ F16L 41/08
[52] U.S. Cl. .......................... 285/156; 285/200; 285/206; 285/236
[58] Field of Search ................................ 285/156, 200, 285/236, 206

[56] References Cited

U.S. PATENT DOCUMENTS

| 1,527,831 | 2/1925 | Borgner | 285/200 X |
|---|---|---|---|
| 1,879,920 | 9/1932 | Church | 285/206 |
| 2,318,376 | 5/1943 | Crowley | 285/200 X |
| 2,500,531 | 3/1950 | Eger | 285/200 X |
| 2,694,022 | 11/1954 | Schreiner | 285/156 X |
| 3,550,899 | 12/1970 | Clarkson | 285/236 X |
| 4,887,851 | 12/1989 | Rush et al. | 285/200 X |
| 5,058,933 | 10/1991 | Mackal | 285/200 |

FOREIGN PATENT DOCUMENTS

| 122838 | 11/1946 | Australia | 285/200 |
|---|---|---|---|
| 2912695 | 10/1979 | Germany | 285/200 |

*Primary Examiner*—Randolph A. Reese
*Attorney, Agent, or Firm*—Evenson, McKeown, Edwards & Lenahan P.L.L.C.

[57] ABSTRACT

A fastening element particularly suitable for fastening a component on a rubber-elastic tube. The fastening element has an essentially concentric shape, an end flange forming one of its ends and the opposite end being provided with a threaded connection. The fastening element is inserted into an opening of the rubber-elastic preform or tube.

4 Claims, 1 Drawing Sheet

FASTENING ELEMENT

BACKGROUND OF THE INVENTION

This invention relates to a fastening element for fastening a component on a rubber-elastic tube or preform.

Various types of fastenings on rubber-elastic parts are known from the state of the art. The most general type of fastening is that which a portion of the rubber-elastic element is vulcanized on. This is a very reliable type of fastening, but its use in manufacturing is very expensive and cost intensive. Other fastening elements include, for example, screwed connections which, however, are not secure with respect to being torn out.

SUMMARY OF THE INVENTION

It is therefore the object of this invention to provide a fastening element which, on the one hand, is low in cost and, on the other hand, enables arbitrary components to be reliably fastened to a rubber-elastic tube or preform.

This and other objects of the invention are achieved by providing a fastening element for fastening a component to a rubber-elastic tube or a preform, said fastening element having an essentially concentric shape and comprising an end flange forming a first end thereof and an oppositely disposed second end which is provided with a threaded connection, said fastening element being adapted to be inserted in use into an opening in the rubber-elastic tube or preform.

The advantage of the invention is the special constructive design of the fastening element. Particularly the combination of a concentric fastening element with an end flange and an oppositely disposed threaded connection provides reliable fastening of arbitrary components and connecting parts.

A preferred embodiment of the invention envisions that the fastening element is provided with a passage bore. This creates the possibility of providing a simple branch-off from a tube in order to introduce or discharge a liquid or a gas.

A further embodiment of the invention envisions ribs or grooves provided on the fastening element for securing the fastening element against torsion.

According to an advantageous further embodiment, the concentric area of the fastening element is expanded, starting from the threaded connection, in a conical manner, to a defined diameter. This shape has the advantage that it enables the fastening element to be mounted in a simple manner in the rubber-elastic tube, and at the same time to be secured against being pressed out.

The fastening element of the invention may preferably be used for fastening a vacuum indicating device on the clean-air-side connection of an air filter of an internal-combustion engine.

These and other individual characteristics of preferred further embodiments of the invention, which are disclosed in the specification and/or drawings in addition to being set forth in the claims, may each be implemented alone or in the form of subcombinations and may find application in various fields of use, and protection is hereby sought for all such embodiments as a part of the invention claimed herein.

BRIEF DESCRIPTION OF THE DRAWINGS

The invention will be explained in further detail hereinafter with reference to an illustrative preferred embodiment shown in the accompanying drawings in which.

DETAILED DESCRIPTION OF PREFERRED EMBODIMENTS

Figure 1:
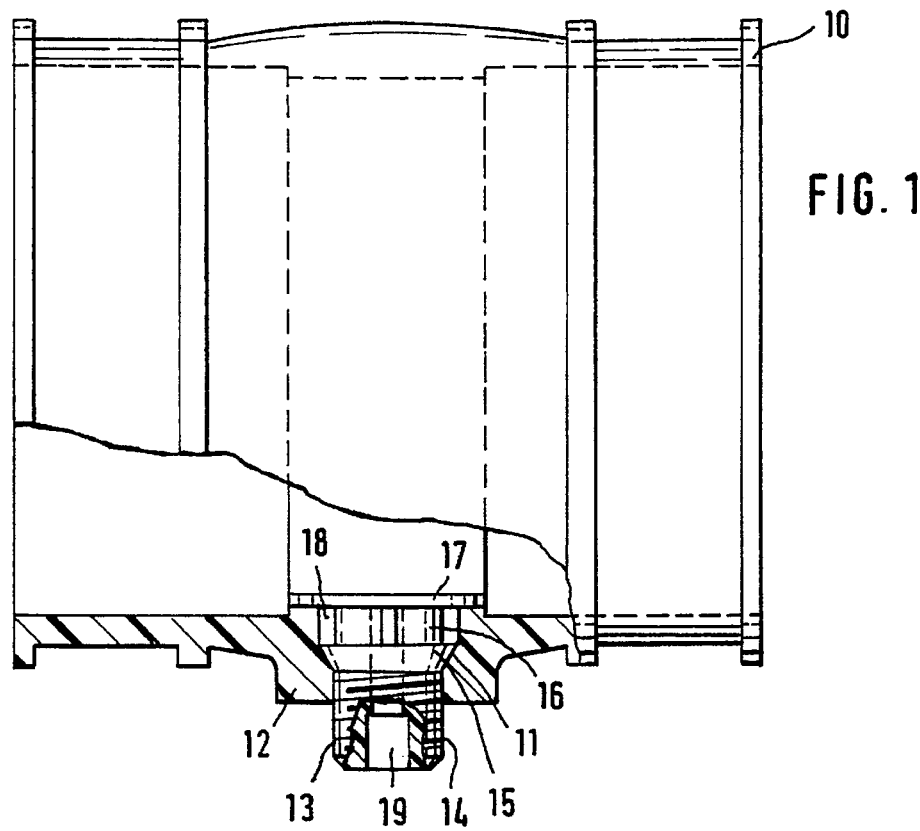
FIG. 1 is a view of a fastening element according to the present invention arranged in a rubber-elastic tube.

FIG. 1 illustrates a rubber-elastic tube 10 which, in this case, is constructed as a connection piece; that is to say, it has socket-like fittings on both sides for receiving connection pieces which are inserted therein and are fastened there by means of suitable elements, such as pipe saddles or tube clamps. This rubber-elastic tube 10 has a radial opening 11, which is reinforced by means of a projecting boss 12. A fastening element 13, which may be made of any desired durable synthetic resin material, is arranged in the opening 11. This fastening element 13 has an external thread 14 at one end thereof and a conical transition 15 to a cylindrical area 16. A flange area 17 adjoins the cylindrical area 16. Cylindrical area 16 is provided with a plurality of axially extending ribs 18. These ribs 18 secure the fastening element against torsion and prevent it from being turned in the bore 11. The fastening element is also provided with a central axial passage bore 19 through which a fluid, i.e. a liquid or a gas, may be introduced into or withdrawn from the rubber-elastic tube 10. As shown in FIG. 1, the flange 17 extends radially with respect to a central axis of the fastening element 13, forming a flat support surface which contacts an interior surface of the rubber-elastic tube 10. The cylindrical area 16 and the conical transition 15 each form a support surface which contacts the rubber-elastic tube 10 at a surface surrounding the opening 11.

Figure 2:
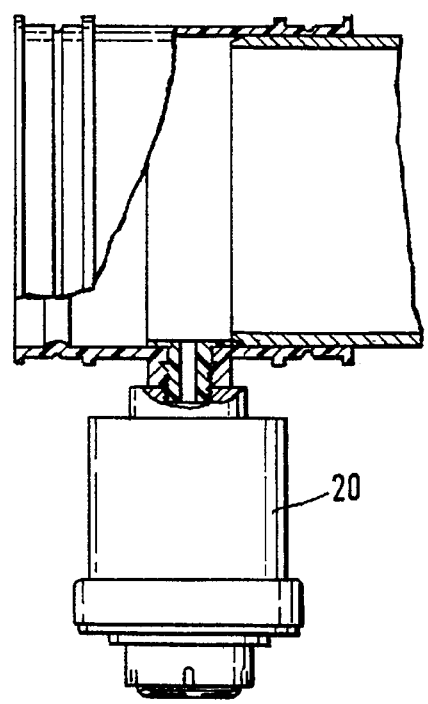
FIG. 2 shows a differential-pressure indicating device fastened on the clean-air duct of an air filter.

As shown in FIG. 2, a component 20 which is to be arranged on the fastening element—in this case, a differential-pressure indicator—is screwed directly on the thread 14. This component 20 rests against the reinforcing boss 12 or against a shoulder of the rubber-elastic tube 10 so that no additional elements are required for securing the fastening element.

During the mounting, the fastening element 13 is extended from the inside of the rubber-elastic tube 10 through the bore 11, and the component 20 is screwed onto the thread 14 from the outside.

The component 20 may also be arranged directly on the cone of the fastening element. It is an advantage in this case that the add-on part will not become detached even if the reinforcing boss of the rubber-elastic element subsides or shrinks because the add-on part will be connected to the fastening element in a force-locking manner.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fastening element for fastening a component to a rubber-elastic tube or preform, said rubber-elastic tube or preform having an interior surface, an exterior surface, and an opening extending between said interior surface and said exterior surface, said opening being defined by an opening surface, said fastening element being adapted to be inserted in use into said opening and having an essentially concentric shape with respect to a central axis, said fastening element comprising:

an end flange forming a first longitudinal end thereof;

an oppositely disposed second longitudinal end which is provided with a threaded connection;

a conical section which expands conically from said threaded connection toward said end flange; and a cylindrical section which extends between the conical section and the end flange, said end flange extending radially with respect to said central axis to form a flat first support surface which contacts said interior surface of the rubber-elastic tube or preform, said conical section forming a second support surface which contacts said opening surface of the rubber-elastic tube or preform, and said cylindrical section forming a further support surface which contacts said opening surface of the rubber-elastic tube or preform.

2. A fastening element according to claim 1, wherein said fastening element is provided with an axial passage bore therethrough.

3. A fastening element according to claim 1, wherein stabilizing ribs or grooves are provided on a surface of said fastening element which contact the rubber-elastic tube or preform when the fastening element is mounted thereon.

4. A fastening element according to claim 2, wherein said fastening element is received through an opening in a wall of a rubber-elastic air tube of an internal combustion engine, and the threaded end of the fastener is screwed into mating threads of a vacuum indicator, whereby the vacuum indicator is fastened to the rubber-elastic air tube.

* * * * *